UNITED STATES PATENT OFFICE.

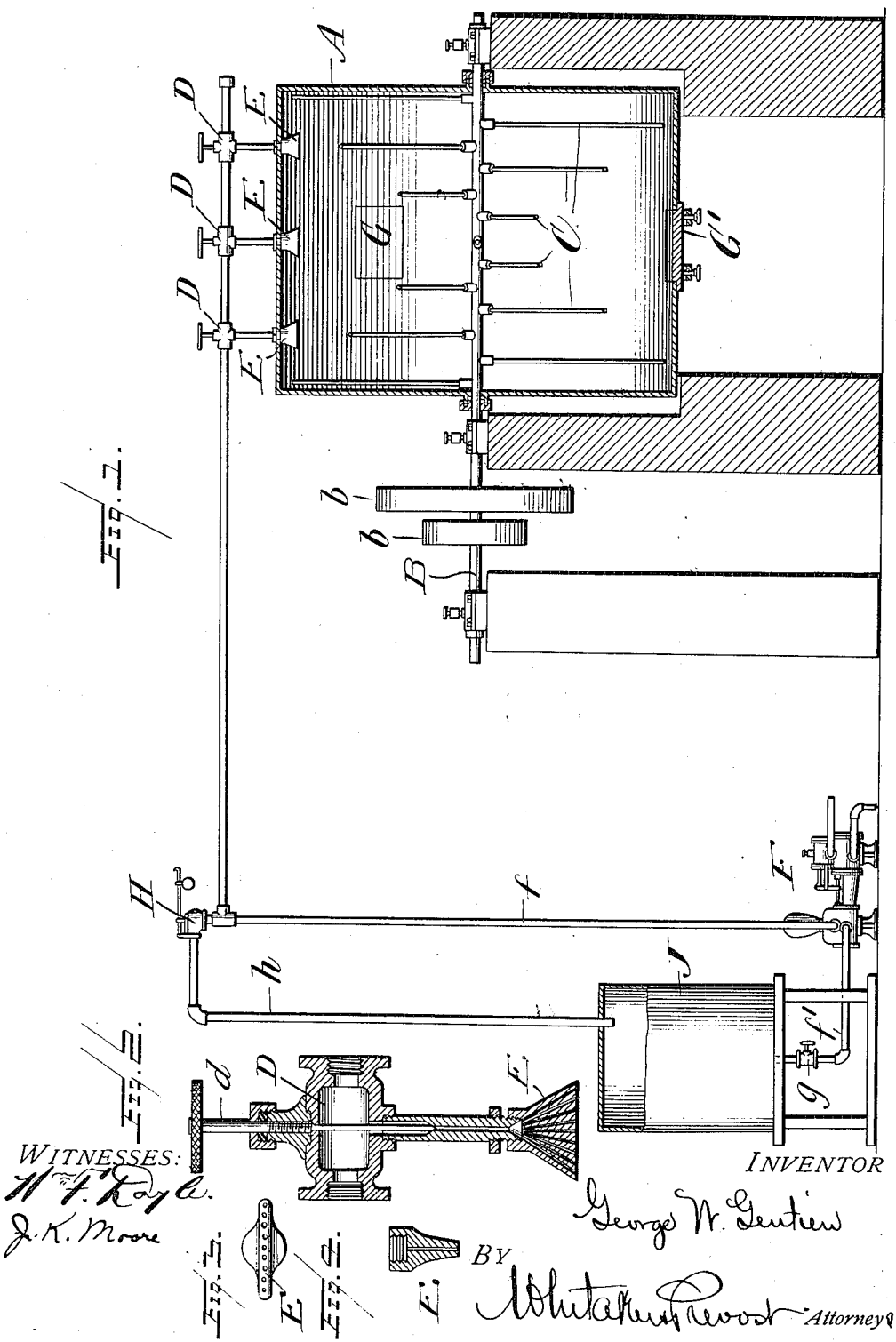

GEORGE W. GENTIEU, OF PEORIA, ILLINOIS.

PROCESS OF MANUFACTURING SMOKELESS POWDER.

No. 837,463.      Specification of Letters Patent.      Patented Dec. 4, 1906.

Application filed April 2, 1906. Serial No. 309,485.

*To all whom it may concern:*

Be it known that I, GEORGE W. GENTIEU, a citizen of the United States, residing at Peoria, in the county of Peoria and State of Illinois, have invented certain new and useful Improvements in Processes of Manufacturing Smokeless Powder; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form of apparatus for carrying my process into effect; and my invention is fully disclosed in the following description and claims.

Referring to the said drawings, Figure 1 represents a sectional view, partly in elevation, of an improved apparatus which I prefer to employ in carrying my process into effect, although I do not confine myself to the style of apparatus shown, as other apparatus may be used in which the same principle involved by my process could be employed. Fig. 2 is a detail sectional view of the spraying device and valve. Figs. 3 and 4 are detail views of the spraying-nozzle.

My invention relates to improvements in the manufacture of explosive compounds, especially to that class known as "smokeless" gunpowders and which are made from nitrated cellulose, or guncotton.

It consists in an improved process whereby finely-divided or pulped nitrocellulose containing from fifteen per cent. to forty per cent. of water is agitated in a suitable receptacle, and during such agitation while the moist nitrocellulose is being hurled upward from the bottom of the receptacle it is brought into violent contact with a descending stream of solvent which is soluble in water. This solvent is delivered at a constant degree of pressure, approximately one hundred and twenty-five pounds per square inch, and by means of the velocity imparted to the streams by this pressure is driven into the particles of moist nitrocellulose and, combining with the water, effects a slow colloiding of the nitrocellulose, after which the colloided or gelatinized particles are removed to any form of well-known solvent-recovery apparatus (not shown) and the solvent recovered.

The main objects of my invention are to produce a gunpowder which shall have a greater stability than is possible by the use of other methods, to overcome all danger to workmen and apparatus by using moist nitrocellulose, to produce a powder-grain more compact and less porous in order that the powder be less liable to absorb moisture from the atmosphere.

Another object is to use solvents miscible in water and having a lower boiling-point than water in order that the solvent and water may be removed from the powder-grains with a lower degree of heat than would be necessary to use with solvents of high boiling-point.

These objects and manner of reaching same are more clearly hereinafter set forth.

My process enables me to produce a powder that does not deteriorate with age, is practically unaffected by changes of atmospheric conditions due to the compact nature of the grain, and owing to the simple and inexpensive machinery required it can be produced at a less cost than by any other process now known. The valuable solvents can also be recovered easily without injury to the powder. Owing to the volatile nature of the solvents, a low degree of heat (43° centigrade) is required. By the use of my process the danger to workmen is entirely removed, as the powder is made in the wet stage and is practically unexplosive.

In carrying my improved process into effect I take nitrocellulose of the suitable degree of nitration to make the desired smokeless powders. For example, for making powders adapted for use in shot-guns and rifles I grind, pulp, or beat the nitrocellulose into a finer state than is usually the case, the reason for which will be hereinafter explained. This finely-ground nitrocellulose, after it has been thoroughly cleansed from acid and has passed the necessary heat or stability tests equal to the requirements of the United States Government, is treated in a centrifugal wringer, operated at very high speed, until the quantity of water left in the nitrocellulose is from fifteen per cent. to forty per cent., the quantity of water left in the nitrocellulose partially determining the density of the grain of the finished powder. The nitrocellulose is now introduced into a suitable vessel fitted with an agitating or stirring device provided with swiftly-revolving blades and is rapidly agitated. The nitrocellose while being thrown up and agitated is treated with a rapidly-descending spray of a suitable solvent, which boils at a lower temperature than water and miscible in water, which is discharged with considerable force into the vessel and coming with great speed in contact with the damp nitrocellulose is driven into the mass or particles, breaking the nitrocellulose into smaller grains, at the same time permeating into the interior of the grains, combining with the water, and forming a deterrent solvent, which colloids the grains to the required degree necessary to produce a stable powder.

The size of the grains and the quantity of a marketable product is influenced to a marked extent by the degree of fineness to which the nitrocellulose is ground, pulped, or beaten. This is due to the tendency of the cellulose materials to mat or collect together in large lumps. The size and quantity of grain is also regulated in part by the speed of the stirrer-shaft and the force with which the descending spray of solvent strikes the nitrocellulose, also the per cent. of moisture left in the nitrocellulose. By carefully regulating the different operations I am enabled to produce satisfactory results.

The solvents I prefer to use are the well-known solvents ethyl and methyl alcohol, acetone, or any other suitable solvent whose boiling or evaporating point is below that of water and which are miscible or soluble to a great extent in water. By driving the solvent into the wet nitrocellulose grains, as before described, the solvent and water in the grains immediately combine, forming a deterrent solvent, which immediately acts uniformly upon all portions of the grains, colloiding them to the desired degree.

Owing to the fact that water when mixed with a larger proportion of a solvent miscible with it of a lower boiling-point boils at nearly the same degree of heat as the liquid of the lowest boiling-point, I am enabled to successfully remove the solvent and water by the use of a low degree of heat, thus producing a powder whose stability has not been injured to the least extent by use of excessive heat, and I also recover the valuable solvent. The amount of steam or heat saved is an important factor in the cost of production.

It is of the utmost importance that the lowest possible degree of heat be employed in the manufacture of the powder and removal of the solvent in order to maintain the stability of the nitrocellulose and to produce a stable powder. It is a well-known fact to those skilled in the art that nitrocellulose, no matter how well purified from acid, will begin to decompose slowly at temperatures in excess of 140° Fahrenheit, the higher the temperature the quicker the rate of decomposition. For example, the best purified nitrocellulose will begin to decompose in twenty to eighty minutes at 150° Fahrenheit, while at 212° Fahrenheit (the boiling-point of water) decomposition takes place in less than ten minutes, and at 365° Fahrenheit the best nitrocellulose will explode. At temperatures of 120° Fahrenheit and lower nitrocellulose is very stable and will stand without any trace of decomposition for months and years, so that powder manufactured at a low degree of heat will be able to stand for years without any chemical change taking place. I do not employ a higher degree of heat than 110° Fahrenheit to remove the solvent, while the powder is manufactured at ordinary atmospheric temperatures, no artificial heat being used. I am thus enabled to maintain the original stability of the nitrocellulose unimpaired.

In order that my improved process may be more clearly understood, I have illustrated in the accompanying drawings an apparatus which I prefer to employ for carrying the process into effect.

In the drawings, A represents a receptacle or tank, preferably cylindrical in form, supported in any desired manner and provided with manholes at top and bottom closed by manhole-covers G and G' for the introduction and removal of the nitrocellulose. A stirrer shaft or axle B passes through the cylindrical tank A, is mounted in suitable bearings, and provided with driving means, such as pulleys b, as shown, for driving it at various speeds. Within the tank A the shaft B is provided with a series of radial agitating arms or blades C for the purpose of tossing the nitrocellulose upward and thoroughly agitating it. The arms or blades are preferably arranged in positions at equal distances around the shaft or axle B.

J represents a small cylindrical tank which is used as a receptacle or reservoir to contain the solvent.

$f'$ is the suction-pipe connecting the reservoir J with the small steam-pump F and is provided with the controlling gate-valve g in order to shut off the supply of solvent when desired.

$f$ is the delivery or discharge pipe which delivers the solvent from the pump F to the jet-valves D D D.

H is an angle-lever safety-valve provided with an adjustable weight and which is set to open at a certain pressure to deliver the surplus solvent through the pipe h back to the reservoir J.

D represents a three-way jet-valve provided with needle-valve d and a fan-shaped manifold spraying-nozzle E, through which the solvent is delivered at a high pressure with great velocity into the nitrocellulose.

In using this apparatus to carry my improved process into effect the pulped nitrocellulose having been treated in a centrifugal wringer until only the desired percentage of moisture, usually from fifteen per cent. to forty per cent., is retained, is then charged into the tank A by means of the manhole G, the shaft or axle B is revolved at the desired speed, and the moist nitrocellulose is agitated and thrown upward by means of the arms or blades C. The desired solvent, which is miscible in water, has previously been introduced in the reservoir J, and the pump F being set in motion draws the solvent through the suction-pipe $f''$, the valve $g$ being open, and delivers it under pressure through the pipe $f$ to the jet-valves D D D and thence discharges it through the fan-shaped manifold spraying-nozzles E E E in fine streams of very high velocity, and coming into contact with the mass or grains of moist nitrocellulose the solvent is driven into the material with great force, breaking it into smaller particles or grains, at the same time combining with the water in the nitrocellulose to effect a deterrent colloiding of the nitrocellulose, thus enabling the grains to become colloided slowly and uniformly throughout the entire mass.

In order to obtain the high pressure at a uniform rate, I use a pump F of a greater delivering capacity than the jet-valves D D D and provide the safety-valve H on the delivery-pipe $f$ to deliver the surplus solvent back to the reservoir J through the overflow-pipe $h$. The safety-valve H will ordinarily be set to open at about one hundred and twenty-five pounds to the square inch; but I do not limit myself to the exact pressure. The desired quantity of solvent having been injected into the moist nitrocellulose and sufficient time (usually two to four hours) having been allowed in which to colloid the grains to the desired degree, the wet grains are now removed through the lower manhole G' and placed in any suitable solvent-recovery apparatus, (not shown,) in which the powder is exposed to a temperature not exceeding 43° centigrade, and the powder is thus dried and the solvent recovered at leisure. The grains are then sieved and will form a valuable smokeless powder.

To aid the combustion of the nitrocellulose, limited quantities of nitrate of potassium, nitrate of barium, nitrate of sodium, or other nitrates possessing the requisite percentage of oxygen may be added at any stage of the process, if desired.

The apparatus shown and described is not claimed in this application.

What I claim, and desire to secure by Letters Patent, is—

1. The herein-described process of manufacturing explosives which consists in agitating finely-divided nitrocellulose, containing water to the extent of not less than fifteen per cent. and not exceeding forty per cent., and injecting into it at a pressure of substantially one hundred and twenty-five pounds per square inch, during such agitation, a solvent having a boiling-point lower than that of water, to drive the solvent into the particles of nitrocellulose, and cause it to unite with the water therein, to produce a diluted solvent of lower boiling-point than water, and to effect a deterrent colloiding of the nitrocellulose grains, then subjecting the colloided grains to heat at a temperature not exceeding 43° centigrade to recover the surplus solvent and dry the grains.

2. The herein-described process of manufacturing explosives which consists in agitating finely-divided nitrocellulose containing water in excess of fifteen per cent., injecting into the material during such agitation a solvent soluble in and having a lower boiling-point than water, to cause the solvent to unite with the water in the nitrocellulose, and uniformly and slowly colloid the grains thereof, then treating the colloided grains with heat at lower temperature than the boiling-point of water to recover the surplus solvent, and dry the grains.

3. The herein-described process of manufacturing explosives, which consists in agitating finely-divided nitrocellulose containing water in excess of fifteen per cent. and treating it with a solvent, soluble in and having a lower boiling-point than water, to cause the solvent to unite with the water in the nitrocellulose, and uniformly colloid the grains, and then drying the grains.

In testimony whereof I affix my signature in the presence of two witnesses.

GEORGE W. GENTIEU.

Witnesses:
MARY E. COMEGYS,
E. M. GILES.